US012356894B2

(12) United States Patent
Kahlig et al.

(10) Patent No.: US 12,356,894 B2
(45) Date of Patent: Jul. 15, 2025

(54) GRAIN TRANSFER ELEMENT LOCKING SYSTEM AND RELATED METHODS

(71) Applicant: J. & M. Manufacturing Co., Inc., Ft. Recovery, OH (US)

(72) Inventors: Sean Kahlig, Ft. Recovery, OH (US); Dustan Grieshop, Ft. Recovery, OH (US)

(73) Assignee: J. & M. Manufacturing Co., Inc., Ft. Recovery, OH (US)

(*) Notice: Subject to any disclaimer, the term of this patent is extended or adjusted under 35 U.S.C. 154(b) by 155 days.

(21) Appl. No.: 18/107,153

(22) Filed: Feb. 8, 2023

(65) Prior Publication Data

US 2023/0255144 A1     Aug. 17, 2023

Related U.S. Application Data

(60) Provisional application No. 63/310,451, filed on Feb. 15, 2022.

(51) Int. Cl.
| | |
|---|---|
| *B60P 1/42* | (2006.01) |
| *A01D 41/12* | (2006.01) |
| *A01D 90/10* | (2006.01) |
| *G01L 5/00* | (2006.01) |

(52) U.S. Cl.
CPC ......... *A01D 90/10* (2013.01); *A01D 41/1217* (2013.01); *G01L 5/0019* (2013.01)

(58) Field of Classification Search
None
See application file for complete search history.

(56) References Cited

U.S. PATENT DOCUMENTS

| | | | |
|---|---|---|---|
| 3,452,885 A * | 7/1969 | Love | A01D 41/1217 198/674 |
| 4,342,383 A | 8/1982 | Burnett | |
| 4,415,303 A | 11/1983 | Westendorf | |
| 5,340,265 A | 8/1994 | Grieshop | |
| 5,957,331 A | 9/1999 | Minor et al. | |
| 6,296,435 B1 | 10/2001 | Wood | |
| 6,447,215 B1 * | 9/2002 | Wellmar | B65G 53/66 406/122 |
| 6,497,546 B2 * | 12/2002 | Wood | B60P 1/42 414/335 |
| 6,776,569 B1 | 8/2004 | McMahon et al. | |
| 8,702,368 B2 | 4/2014 | Van Mill | |

(Continued)

OTHER PUBLICATIONS

J. & M. Mfg. Co., Inc., Auto Gate Shut Off Installation Manual, Rev Feb. 26, 2014, 12 pgs.

(Continued)

*Primary Examiner* — Joseph A Dillon, Jr.
(74) *Attorney, Agent, or Firm* — Rooney IP, LLC

(57) ABSTRACT

A system for directing the movement of a grain transfer element. The system includes a torque sensor and a processor. The torque sensor is configured to detect a torque of a drivetrain configured to drive the transfer element. The processor is configured to compare the detected torque to a torque threshold, and direct the movement of the transfer element between a folded position and an unloading position. The directed movement of the transfer element is based at least in part on a result of the comparison of the detected torque and the torque threshold.

26 Claims, 3 Drawing Sheets

(56) References Cited

U.S. PATENT DOCUMENTS

| | | |
|---|---|---|
| 9,113,598 B2 | 8/2015 | Wood |
| 9,185,845 B2 | 11/2015 | Van Mill et al. |
| 9,187,259 B2 | 11/2015 | Van Mill et al. |
| 9,272,853 B2 | 3/2016 | Van Mill et al. |
| 9,596,805 B2 | 3/2017 | Van Mill et al. |
| 9,596,809 B2 | 3/2017 | Van Mill et al. |
| 9,604,785 B1 | 3/2017 | Gaerke |
| 9,706,713 B2 | 7/2017 | Van Mill |
| 9,723,789 B2 | 8/2017 | Van Mill |
| 9,763,389 B2 | 9/2017 | Bump et al. |
| 9,873,570 B2 | 1/2018 | Van Mill et al. |
| 10,028,434 B2 | 7/2018 | Van Mill et al. |
| 10,028,441 B2 | 7/2018 | Van Mill et al. |
| 10,160,367 B2 | 12/2018 | Van Mill |
| 10,426,092 B2 | 10/2019 | Van Mill |
| 10,485,177 B2 | 11/2019 | Bump |
| 10,542,676 B2 | 1/2020 | Van Mill |
| 10,743,474 B1 | 8/2020 | Schlimgen |
| 10,765,063 B2 | 9/2020 | Van Mill et al. |
| 10,807,812 B2 | 10/2020 | Thomson et al. |
| 11,008,177 B2 | 5/2021 | Banthia |
| 11,104,258 B2 | 8/2021 | Grieshop et al. |
| 11,140,829 B2 | 10/2021 | Van Mill |
| 11,343,971 B2 | 5/2022 | Van Mill |
| 11,457,562 B2 | 10/2022 | Van Mill et al. |
| 11,533,845 B2 * | 12/2022 | Koch ..................... G06Q 50/02 |
| 11,825,765 B2 | 11/2023 | Van Mill et al. |
| 2010/0254792 A1 | 10/2010 | Kinzenbaw |
| 2011/0164952 A1 | 7/2011 | Hollenberg |
| 2012/0085458 A1 | 4/2012 | Wenzel |
| 2013/0045067 A1 | 2/2013 | Pickett et al. |
| 2013/0089398 A1 * | 4/2013 | Farley ..................... B60P 1/40 |
| | | 198/608 |
| 2013/0251484 A1 * | 9/2013 | Wood ................... A01D 43/073 |
| | | 414/345 |
| 2014/0178163 A1 * | 6/2014 | Johnson ................... B60P 1/36 |
| | | 29/428 |
| 2015/0023767 A1 | 1/2015 | Affleck |
| 2017/0150679 A1 | 6/2017 | Van Mill et al. |
| 2018/0160624 A1 * | 6/2018 | Ducroquet ......... A01D 41/1217 |
| 2018/0317386 A1 | 11/2018 | Van Mill et al. |
| 2019/0141899 A1 | 5/2019 | Winsnes |
| 2019/0322461 A1 | 10/2019 | Banthia et al. |
| 2020/0045887 A1 | 2/2020 | Bump et al. |
| 2020/0238882 A1 * | 7/2020 | Grieshop ................. B60P 1/42 |
| 2020/0367436 A1 | 11/2020 | Schlimgen |
| 2021/0235623 A1 | 8/2021 | Schlimgen |
| 2021/0294337 A1 | 9/2021 | Van Mill et al. |
| 2023/0031013 A1 * | 2/2023 | Faust ................... A01D 41/127 |
| 2023/0115778 A1 * | 4/2023 | Kahlig ................... A01D 90/10 |
| | | 414/345 |
| 2023/0180659 A1 * | 6/2023 | Grieshop ............... A01D 75/18 |
| | | 56/16.6 |
| 2023/0315105 A1 | 10/2023 | Van Mill et al. |
| 2024/0122105 A1 | 4/2024 | Van Mill et al. |
| 2024/0138299 A1 * | 5/2024 | O'Connor .......... A01D 41/1275 |

OTHER PUBLICATIONS

J&M Manufacturing Co, Inc. Grain Cart Operator's Manual, Model X1222 Series, Rev. Apr. 20, 2020, 49 pgs.

Canadian Intellectual Property Office, First Office Action issued in related Canadian Patent Application 3172448, Dec. 7, 2023, 6 pages.

* cited by examiner

GRAIN TRANSFER ELEMENT LOCKING SYSTEM AND RELATED METHODS

CROSS REFERENCE TO RELATED APPLICATION

This application claims the benefit of U.S. Provisional Patent Application Ser. No. 63/310,451 filed on Feb. 15, 2022, the disclosure of which is incorporated herein by reference in its entirety.

TECHNICAL FIELD

The present disclosure generally relates to devices for agricultural harvesting equipment and, more particularly, to automated systems for transferring harvested grain, and related methods.

BACKGROUND

Harvesting operations for some agricultural materials, such as grains, may involve transferring harvested grain into containers for transport. For example, a combine harvester may separate the grain from the other portions of the plant and may discharge the harvested grain into a container for transport. In some circumstances, the combine may discharge the harvested grain directly into a gravity wagon or a grain hopper trailer of a tractor-trailer for transport via roads. In other circumstances, the combine may discharge the harvested grain into a grain cart, which may be used to transport the grain across the field, such as to a road, where the grain cart is unloaded into a gravity wagon or a grain hopper trailer of a tractor-trailer for transport via roads.

The present disclosure contemplates that each grain transfer operation involves the potential for operator error. For example, an operator may unload the contents of a grain cart into a gravity wagon or a grain hopper trailer with an unloading conveyor, such as an auger. It is not uncommon that, while unloading the grain cart, the operator intends to perform an operation with one of the hydraulic levers of the tractor, but activates the wrong lever by mistake. The wrongly activated lever may control an auger folding function causing an upper auger housing to start folding toward a storage position while the auger is still discharging grain. At this point, the costly grain being discharged through the auger may spill onto the ground through an opened hinged joint between the lower and upper auger housings. If the operator notices the mistake, the usual reaction is to quickly reverse the lever to force the upper auger housing back into the discharge position. At this point, the upper auger is disengaged from the lower auger and is driven upward within the upper auger housing due to the flow of grain from the lower auger since the lower auger is still being driven by the tractor PTO and is still turning. The lower auger, upper auger, upper auger housing, springs, bearings and balance of the drive system, including the tractor PTO, may sustain enough damage that downtime and repair may be necessary. This repair and down time may significantly slow down or stop the harvesting operation.

Accordingly, and despite the various advances already made in this field, there is a need for further improvements related to systems and methods for transferring harvested grain into transport containers.

SUMMARY

Generally, a system for directing the movement of a grain transfer element is provided. The system includes a torque sensor and a processor. The torque sensor is configured to detect a torque of a drivetrain configured to drive the transfer element. The processor is configured to compare the detected torque to a torque threshold, and direct the movement of the transfer element between a folded position and an unloading position. The directed movement of the transfer element is based at least in part on a result of the comparison of the detected torque and the torque threshold.

In some embodiments, the directed movement of the transfer element includes preventing the transfer element from moving to the folded position when the detected torque is above the torque threshold. The torque sensor may include a rotational strain gauge. The torque sensor may be disposed on the drivetrain. The torque sensor may be located along the drivetrain. The system may include a user interface device operatively connected to the processor. The user interface device may be configured to notify a user that the transfer element may not be moved to the folded position. The user interface device may be at least one of a smart phone and/or a computer. The system may include an actuator configured to move the transfer element between the folded position and the unloading position and the processor may be configured to direct the operation of the actuator. The system may include a hydraulic actuator configured to move the transfer element between the folded position and the unloading position, and a solenoid configured to control the operation of the hydraulic actuator. The processor may be configured to direct the operation of the solenoid.

An alternative embodiment a system for directing the movement of a grain transfer element is provided. The system includes a grain transfer element, a drivetrain configured to drive the transfer element, a torque sensor configured to detect a torque of the drivetrain, and a processor. The processor is configured to compare the detected torque to a torque threshold, and direct the movement of the transfer element between a folded position and an unloading position. The directed movement of the transfer element is based at least in part on a result of the comparison of the detected torque and the torque threshold.

The directed movement of the transfer element may include preventing the transfer element from moving to the folded position when the detected torque is above the torque threshold. The torque sensor may include a rotational strain gauge. The torque sensor may be disposed on the drivetrain. The torque sensor may be located along the drivetrain. The system may include a user interface device operatively connected to the processor. The user interface device may be configured to notify a user that the transfer element may not be moved to the folded position. The user interface device may include at least one of a smart phone and/or a computer. The system may include an actuator configured to move the transfer element between the folded position and the unloading position. The processor may be configured to direct the operation of the actuator. The system may include a hydraulic actuator configured to move the transfer element between the folded position and the unloading position, and a solenoid configured to control the operation of the hydraulic actuator. The processor may be configured to direct the operation of the solenoid.

Another embodiment of a system for directing the movement of a grain transfer element is provided. The system includes a grain transfer element, a hydraulic actuator, a solenoid, a drivetrain, a torque sensor, and a processor. The hydraulic actuator is configured to move the transfer element between a folded position and an unloading position. The solenoid is configured to control the operation of the hydraulic actuator. The drivetrain is configured to drive the transfer element. The torque sensor is configured to detect a torque of the drivetrain. The processor is configured to compare the detected torque to a torque threshold, and direct the operation of the solenoid. The directed operation of the solenoid is based at least in part on a result of the comparison of the detected torque and the torque threshold.

The directed operation of the solenoid may include preventing the transfer element from moving to the folded position when the detected torque is above the torque threshold. The torque sensor may include a rotational strain gauge. The torque sensor may be disposed on the drivetrain. The torque sensor may be located along the drivetrain. The may include a user interface device operatively connected to the processor. The user interface device may be configured to notify a user that the transfer element may not be moved to the folded position. The user interface device may include at least one of a smart phone and/or a computer.

In alternative or additional aspects, a grain cart may include the grain transfer element and the system for directing the movement of the grain transfer element. A combine harvester may include the grain transfer element and the system for directing the movement of the grain transfer element.

Generally, a method of operating a system for directing the movement of a grain transfer element is disclosed. The method includes operating a torque sensor to detect a torque of a drivetrain, operating a processor to compare the detected torque to a torque threshold, and directing the movement of the transfer element between a folded position and an unloading position. Directing the movement of the transfer element between a folded position and an unloading position is based at least in part on a result of the comparison of the detected torque and the torque threshold.

In some embodiments, the method further includes preventing the transfer element from moving to the folded position when the detected torque is above the torque threshold, notifying a user that the transfer element may not be moved to the folded position, and operating a solenoid to control the operation of a hydraulic actuator to move the transfer element between the folded position and the unloading position.

Generally, a method of manufacturing a system for directing the movement of a grain transfer element is provided. The method includes disposing a torque sensor configured to detect a torque of a drivetrain on and/or near the drivetrain. The method includes coupling the torque sensor to a processor. The processor is configured to compare the detected torque to a torque threshold and direct the movement of the transfer element.

The torque sensor may include a rotational strain gauge. The method may include operatively connecting a user interface device to the processor. The user interface device may include at least one of a smart phone and/or a computer. The method may include coupling a hydraulic actuator to the transfer element and coupling a solenoid to the hydraulic actuator and the processor. The hydraulic actuator may be configured to move the transfer element between the folded position and the unloading position. The solenoid may be configured to control the operation of the hydraulic actuator. The processor may be configured to direct the operation of the solenoid.

Additional features and advantages of the inventive aspects will become more apparent upon review of the following detailed description taken together with accompanying drawings of the illustrative and exemplary embodiments.

DETAILED DESCRIPTION

Illustrative embodiments according to at least some aspects of the present disclosure are described and illustrated below and include devices and methods relating to transferring harvested agricultural materials, such as grain, into transport containers. The present disclosure includes, among other things, systems for transferring harvested grain into transport containers, and related methods. Specifically, a system for preventing the movement of a grain transfer element during an unloading operation to prevent damage to the grain transfer element and related systems is disclosed herein. Some illustrative embodiments according to at least some aspects of the present disclosure are described below in the context of a grain cart and operations involving transferring grain from the grain cart to another container. It will be appreciated, however, that similar systems and methods may be utilized in connection with other agricultural equipment and containers. As used herein, "transport container" may refer to any device configured to hold harvested grain during movement from one location to another location. Exemplary transport containers may include various types of agricultural equipment, such as grain carts, gravity wagons, grain hopper trailers for tractor-trailers, and the like. Transport containers may also include railcars configured to haul grain, barge or ship holds configured to haul grain, and the like. As used herein, "supplying container" may refer to a container from which grain is transferred and "receiving container" may refer to a container into which grain is transferred.

Figure 1:
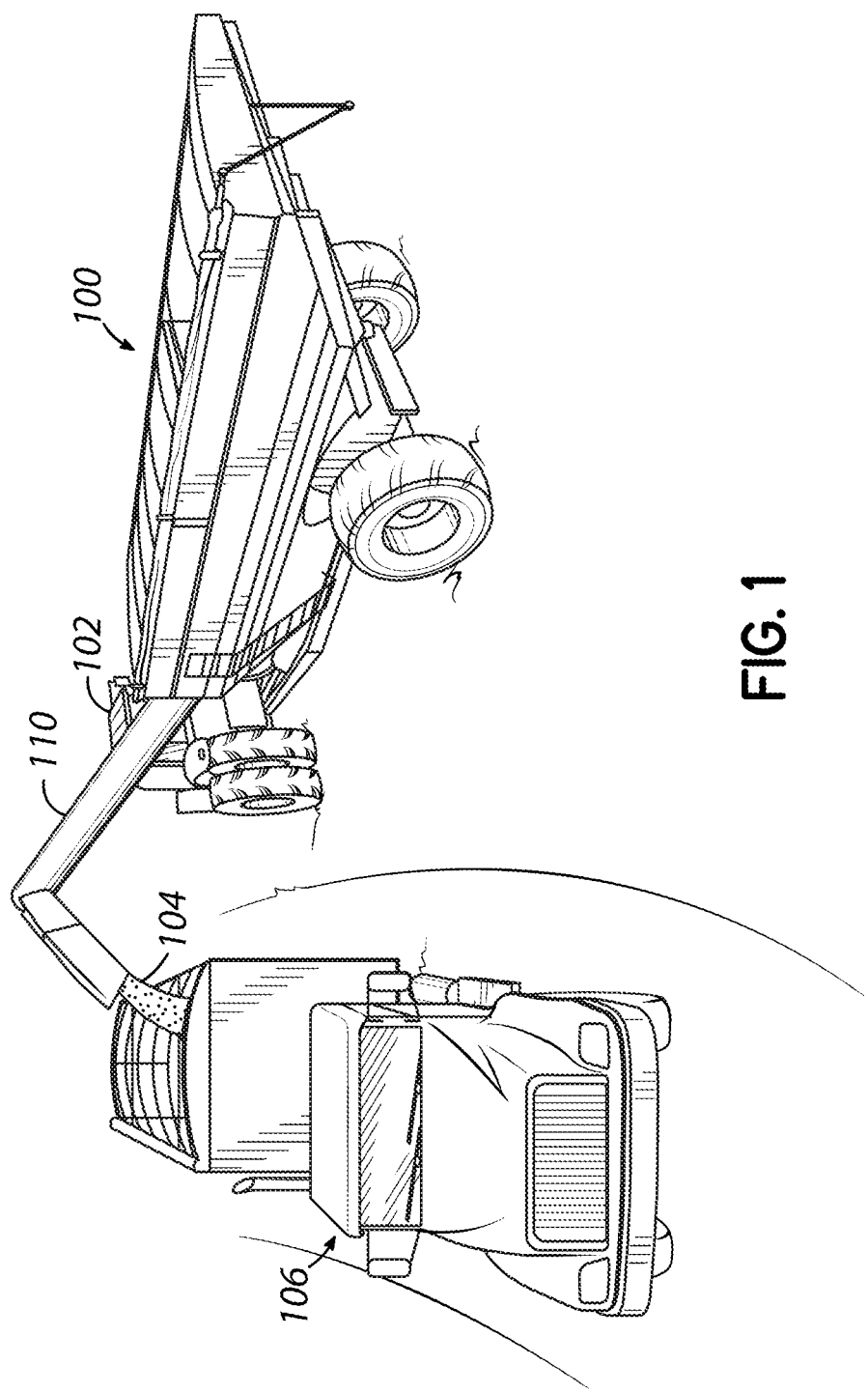
FIG. 1 is a perspective view of a grain cart unloading grain into a grain hopper trailer of a tractor-trailer located on a road on the edge of a field.

FIG. 1 is a perspective view of an illustrative grain cart 100, coupled to a tractor 102, transferring harvested grain 104 to a tractor-trailer 106, according to at least some aspects of the present disclosure. The grain cart 100 includes a grain transfer element 110 and in FIG. 1 the transfer element 110 is in an unloading position. In this example, the transfer element 110 is an auger conveyor, which is configured to transfer the grain 104 from the grain cart 100 to a receiving container.

Figure 2:
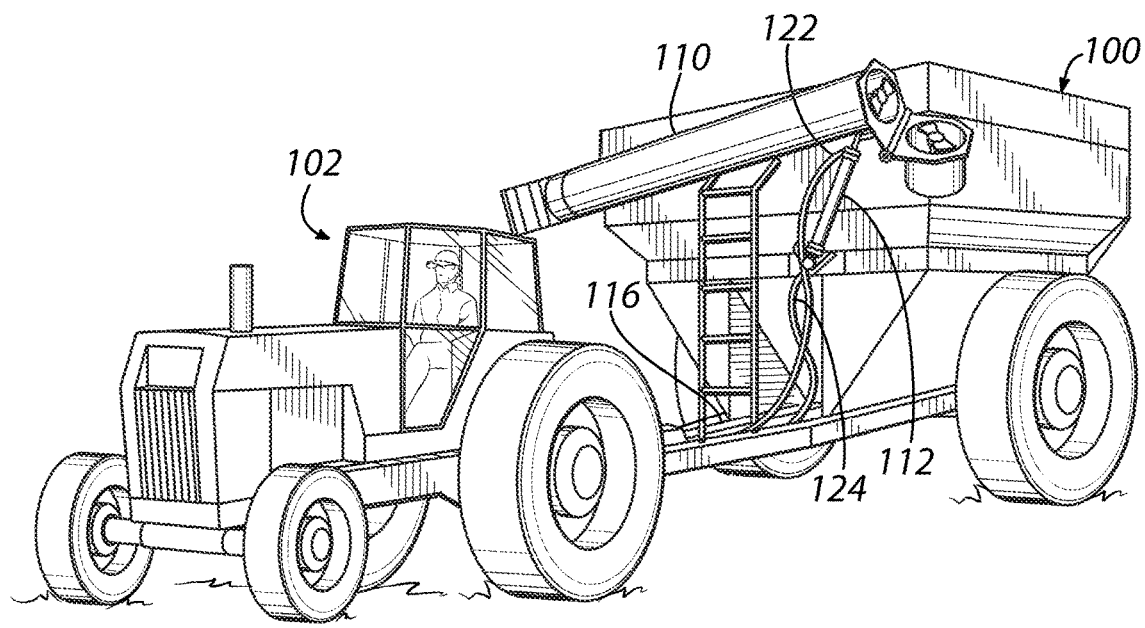
FIG. 2 is a perspective view of the grain cart of FIG. 1 with a grain transfer element in a folded position.
Figure 3:
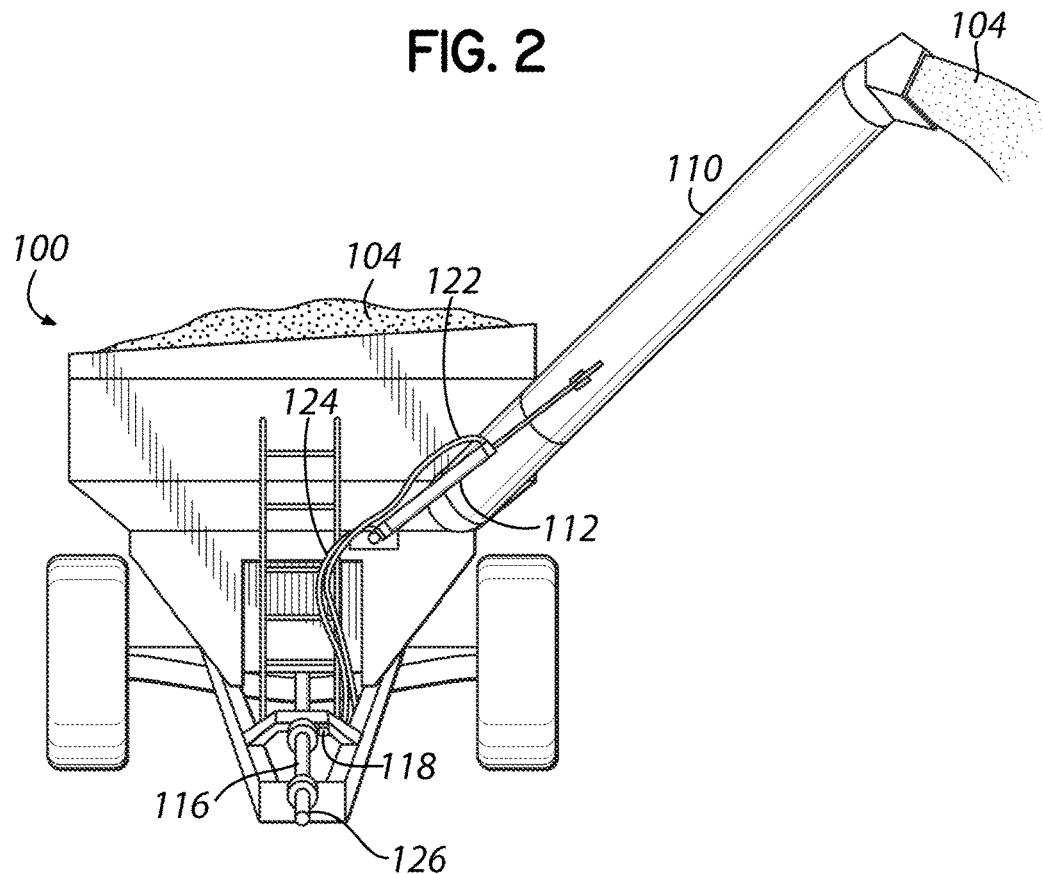
FIG. 3 is an elevation view of the front of the grain cart of FIGS. 1 and 2 with the grain transfer element in an unloading position.
Figure 4:
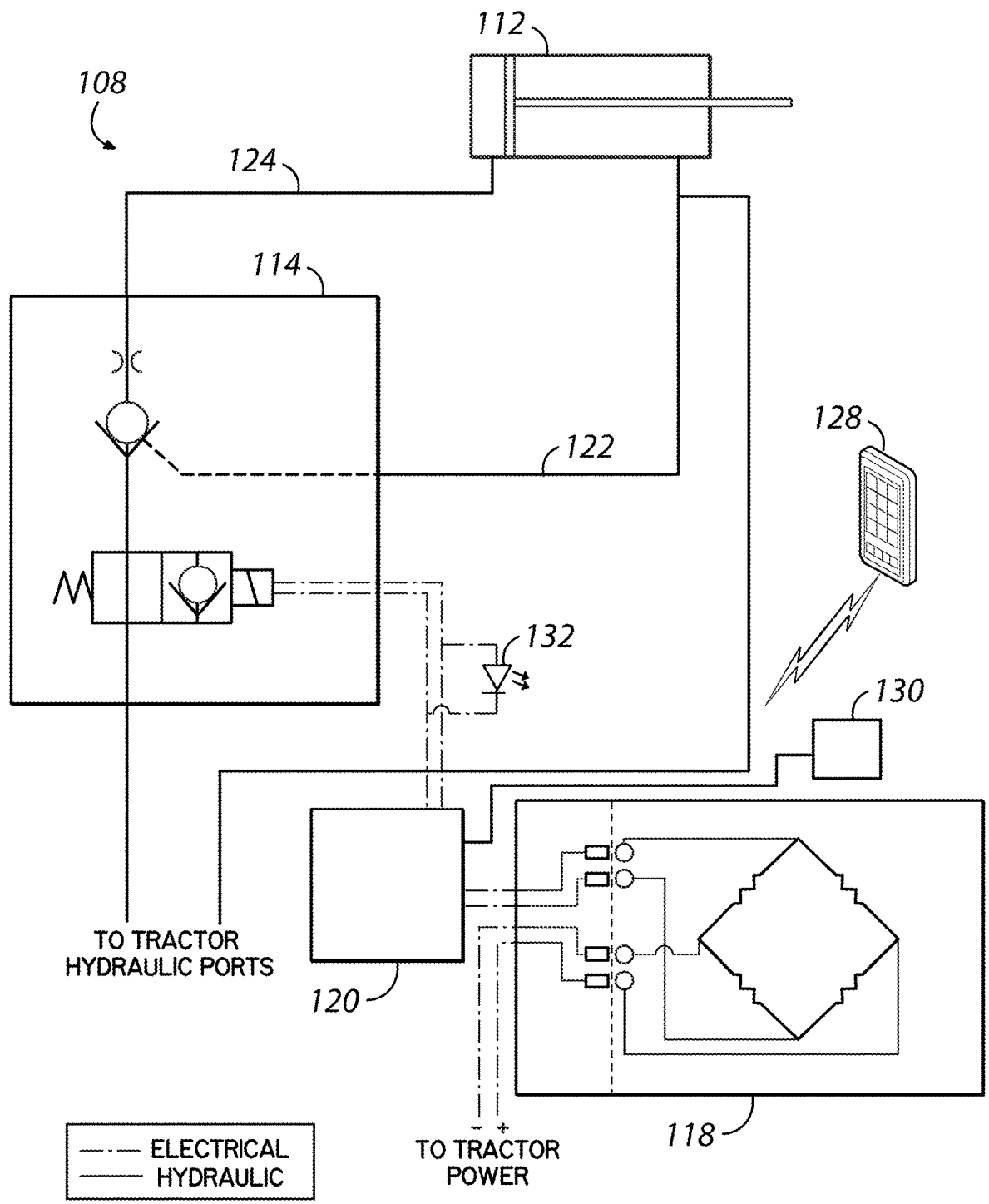
FIG. 4 is a simplified block diagram of a grain transfer element locking system.

FIG. 2 is a perspective view of the illustrative grain cart 100 coupled to a tractor 102 with the transfer element 110 in a folded position, FIG. 3 is a perspective view of the front of the illustrative grain cart 100 with the transfer element 110 in the unloading position. FIG. 4 is a simplified block diagram of an exemplary grain transfer element locking system 108, all according to at least some aspects of the present disclosure.

The grain transfer element locking system 108 directs and/or limits the movement of the grain transfer element 110 when the transfer element 110 is operating, such as while unloading grain 104 from a grain cart 100, for example. Referring to FIGS. 2-4, the illustrative grain cart 100 includes the transfer element 110, an actuator 112, a solenoid 114, a drivetrain 116, a torque sensor 118, and a processor 120. In this illustrative example, the transfer element 110 is an auger conveyor. In some embodiments, the transfer element 110 may be any device configured for unloading grain. The actuator 112 is configured to move the transfer element 110 between a folded position as shown in FIG. 2 and an unloading position as shown in FIGS. 1 and 3. In this illustrative example, the actuator 112 is a hydraulic actuator. In some embodiments, the actuator 112 may be another type of actuator such as a linear actuator, for example.

The drivetrain 116 is configured to drive the transfer element 110. The torque sensor 118 is configured to detect a torque load of the drivetrain 116. In some embodiments, the torque sensor 118 may be multiple sensors. The torque sensor 118 may be any device or combination of devices configured to detect a torque load of the drivetrain 116. In some embodiments, the torque sensor 118 may be a rotational strain gauge. In some embodiments, the torque sensor 118 may be disposed on the drivetrain 116. In other embodiments, the torque sensor 118 may be located along the drivetrain 116. The torque sensor 118 provides the detected torque load as an input to the processor 120. The processor 120 is configured to compare the detected torque load provided by the torque sensor 118 to a torque threshold. The torque threshold is a value indicating a load on the transfer element 110. A value above the torque threshold may indicate the transfer element 110 is in operation such as rotating, for example. To avoid damaging the transfer element 110 and the drivetrain 116, the system 108 may prevent the transfer element 110 from moving between the unloading position and the folded position if the transfer element 110 is in operation. A value above the torque threshold may also or alternatively indicate the presence of grain in the transfer element 110. To avoid spilling grain 104 and damaging the transfer element 110 and the drivetrain 116, the system may prevent the transfer element 110 from moving between the unloading position (FIGS. 1 and 3) and the folded position (FIG. 2) if there is grain 104 in the transfer element 110.

Referring to FIGS. 2 and 3, in this illustrative embodiment, the drivetrain 116 includes a power take-off shaft 126. The power take-off shaft 126 couples to a power take-off or PTO which is carried by the tractor 102 to which the grain cart 100 may be operatively coupled, for example. To operate the transfer element 110, the power take-off shaft 126 is rotated by control of the operator of the tractor 102. Rotation of the power take-off shaft 126 rotates the drivetrain 116. In some embodiments, the drivetrain 116 may be rotated by alternative power sources, such as a hydraulic motor, for example.

Referring again to FIGS. 2-4, in this illustrative embodiment, the processor 120 directs the operation of the solenoid 114. The solenoid 114, or control valve, is configured to direct the operation of the actuator 112. In this illustrative example, the actuator 112 has hoses 122 and 124 connected thereto for flow of fluid into and out of the actuator 112 for operation of the actuator 112. The hoses 122, 124, are connected to the solenoid 114. The solenoid 114 controls the flow of fluid to the actuator 112. The solenoid 114 is joined to a fluid pump, not shown, which is carried by the tractor 104, for example. The directed operation of the solenoid 114 is based at least in part on a result of the comparison of the detected torque load and the torque threshold. The directed operation of the solenoid 114 includes preventing the transfer element 110 from moving from the unloading position when the detected torque load is above the torque threshold. In this exemplary embodiment, the solenoid 114 prevents the flow of fluid to the actuator 112 when the detected torque load is above the torque threshold. In some embodiments, the actuator 112 may be another type of actuator such as a linear actuator, for example, and the processor 120 may direct the operation of the actuator 112 without a solenoid 114.

Referring to FIG. 4, in some embodiments, the system 108 may include a user interface device 128 operatively connected to the processor 120. The user interface device 128 may be operatively connected to the processor 120 via wires and/or wirelessly. For example, an operator driving a tractor 102 pulling a grain cart 100 may utilize a user interface device 128 located in the cab of the tractor 102 to operate or monitor the system 108 on the grain cart 100. In some embodiments, the user interface device 128 may be configured to notify a user that the transfer element 110 may not be moved from the unloading position. Alternatively or in addition, a user interface device 128 may comprise a dedicated device, such a control panel and/or an indicator on a control panel. In some embodiments, the user interface device 128 may be a smart phone and/or computer such as a tablet computer. In some embodiments, the system 108 may be installed on a combine harvester to assist with operation of the grain transfer element 110 of the combine harvester. As one of many other alternatives for allowing operator control and interface, some or all of the necessary processing hardware and software may be contained in and/or accessible through one or more hand held devices such as a tablet computer, lap top computer, smart phone and the like. The software may include a mobile phone application, for example, and/or may be stored remotely, such as "in the cloud."

The illustrative system 108 includes one or more processors 120 configured to provide computation, analysis, control, and/or monitoring functions associated with various elements of the system 108, as described herein. The processor 120 may be operatively coupled to one or more data storage devices 130, which may be comprise instructions for the processor 120 (e.g., software or firmware) and/or which may store data associated with operation of the system 108. Generally, unless specifically indicated otherwise, any operation described herein as being performed by the system 108 may be performed by, at the direction of, and/or under the control of the processor 120.

Exemplary methods of operating a grain transfer element locking system 108 according to at least some aspects of the present disclosure are described below with reference to FIGS. 1-4 and may include optional and/or alternative structures and/or operations. Although FIGS. 1-4 and the corresponding description focus on the use of the system 108 in connection with transferring grain from the grain cart 100, it will be appreciated that generally similar operations may be utilized when transferring grain between other types of equipment, such as generally from any supplying container to any receiving container. Generally, unless specifically indicated otherwise, the various operations described below may be automatically performed or directed by the processor 120, such as instructed by software or firmware.

An exemplary grain cart 100 may be prepared for use, such as by coupling the grain cart 100 to a tractor 102. Additionally, the grain cart's 100 power take-off shaft 126 may be coupled to the tractor's power take-off. Additionally, hydraulic lines may be connected between the tractor 102 and the grain cart 100. The grain cart 100 may be positioned near a receiving container (e.g., a tractor-trailer 106). The tractor's 102 power take-off or other source of energy (hydraulics) for the grain cart may be started. If necessary, the grain transfer element 110 of the grain cart 100 may be extended from a folded position to an unloading position.

Once grain transfer element 110 has been directed to commence the grain transfer operation by the operator, the system 108 may begin monitoring the torque load of the drivetrain 116 of the grain cart 100. The torque sensor 118 may detect a torque of the drivetrain 116. The processor 120 may compare the detected torque to a torque threshold and directing the movement of the transfer element 110 between a folded position and an unloading position based at least in part on a result of the comparison of the detected torque and the torque threshold. If, at any time during the grain transfer operation, the operator attempts to move the grain transfer element 110 from the unloading position and the system 108 determines that the torque load of the drivetrain 116 exceeds a torque threshold the system 108 may prevent the movement of the grain transfer element 110 from the unloading position. In some embodiments, the system 108 may be configured to alert the operator that the grain transfer element 110 may not be moved from the unloading position due to the torque load of the drivetrain 116 exceeding a torque threshold. The system 108 may alert the operator with a visual indication through an indicator 132 or through the user interface device 128, for example. In some embodiments, the system 108 includes an override option configured to allow the operator to move the transfer element between the unloading position and the folded position despite the warning that the grain transfer element 110 should not be folded due to the torque load of the drivetrain 116 exceeding a torque threshold.

Accordingly, by utilizing grain transfer element locking system, such as the illustrative system 108, the risk of grain spillage and damage to the grain transfer element 110 and related systems during grain transfer operations may be reduced.

A method of manufacturing a system for directing the movement of a grain transfer element 108 includes mounting at least one torque sensor 118 configured to detect a torque of the drivetrain 116 on or near the drivetrain 116. The torque sensor 118 is coupled to the processor 120. The processor 120 is configured to compare the detected torque to a torque threshold and direct the movement of the transfer element 110. In some embodiments, the torque sensor 118 may be a rotational strain gauge. The method may include operatively connecting a user interface device 128 to the processor 120. In some embodiments, the user interface device 128 may be a smart phone and/or a computer, such as a tablet computer. The method may include a coupling a hydraulic actuator 112, configured to move the transfer element 110 between the folded position and the unloading position, to the transfer element 110. The method may include coupling a solenoid 114, configured to control the operation of the hydraulic actuator 112, to the hydraulic actuator 112 and the processor 120. The processor 120 may be configured to direct the operation of the solenoid 114.

Exemplary methods of manufacturing a grain cart 100 according to at least some aspects of the present disclosure may include installing and/or operatively connecting various components of the illustrative system 108 as described herein. Exemplary methods of manufacturing a combine harvester according to at least some aspects of the present disclosure may include installing and/or operatively connecting various components of the illustrative system 108 as described herein.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The invention in its broader aspects is therefore not limited to the specific details, representative apparatus and methods and illustrative examples shown and described. The illustrative embodiments as discussed may include optional steps, methods, and features that one of ordinary skill should recognize as not being a requisite to fall within the scope of the present disclosure.

What is claimed is:

1. A system for directing the movement of a grain transfer element, the system comprising:
    a torque sensor configured to detect a torque of a drivetrain configured to drive the transfer element; and
    a processor operatively connected to the torque sensor and configured to compare the detected torque to a torque threshold and direct the movement of the transfer element between a folded position and an unloading position based at least in part on a result of the comparison of the detected torque and the torque threshold.

2. The system of claim 1, wherein the torque sensor comprises a rotational strain gauge.

3. The system of claim 1, further comprising a user interface device operatively connected to the processor.

4. The system of claim 3, wherein the user interface device is configured to notify a user that the transfer element may not be moved to the folded position.

5. The system of claim 3, wherein the user interface device comprises at least one of a smart phone or a computer.

6. The system of claim 1, further comprising an actuator configured to move the transfer element between the folded position and the unloading position;
    wherein the processor is operatively connected to the actuator and configured to direct the operation of the actuator.

7. The system of claim 1, further comprising:
    a hydraulic actuator configured to move the transfer element between the folded position and the unloading position; and
    a solenoid operatively connected to the actuator and configured to control the operation of the hydraulic actuator;
    wherein the processor is operatively connected to the solenoid and configured to direct the operation of the solenoid.

8. A grain cart, comprising:
    a grain transfer element; and
    the system of claim 1.

9. A grain cart comprising:
    a container configured to hold agricultural material;
    a transfer element configured to transfer agricultural material from the container;
    a drivetrain configured to drive the transfer element;
    a torque sensor configured to detect a torque of the drivetrain; and
    a processor operatively connected to the torque sensor and configured to compare the detected torque to a torque threshold and direct the movement of the transfer element between a folded position and an unloading position based at least in part on a result of the comparison of the detected torque and the torque threshold.

10. The grain cart of claim 9, wherein the torque sensor comprises a rotational strain gauge.

11. The grain cart of claim 9, further comprising a user interface device operatively connected to the processor.

12. The grain cart of claim 11, wherein the user interface device is configured to notify a user that the transfer element may not be moved to the folded position.

13. The grain cart of claim 11, wherein the user interface device comprises at least one of a smart phone or a computer.

14. The grain cart of claim 9, further comprising an actuator configured to move the transfer element between the folded position and the unloading position;
wherein the processor is configured to direct the operation of the actuator.

15. The grain cart of claim 9, further comprising:
a hydraulic actuator operatively connected to the transfer element and configured to move the transfer element between the folded position and the unloading position; and
a solenoid operatively connected to the actuator and configured to control the operation of the hydraulic actuator;
wherein the processor is configured to direct the operation of the solenoid.

16. A grain cart comprising:
a container configured to hold agricultural material;
a transfer element configured to transfer agricultural material from the container;
a hydraulic actuator operatively connected to the transfer element and configured to move the transfer element between a folded position and an unloading position;
a solenoid operatively connected to the actuator and configured to control the operation of the hydraulic actuator;
a drivetrain configured to drive the transfer element;
a torque sensor configured to detect a torque of the drivetrain; and
a processor operatively connected to the torque sensor and the solenoid, and configured to compare the detected torque to a torque threshold and direct the operation of the solenoid based at least in part on a result of the comparison of the detected torque and the torque threshold;
wherein the directed operation of the solenoid includes preventing the transfer element from moving to the folded position when the detected torque is above the torque threshold.

17. The grain cart of claim 16, wherein the torque sensor comprises a rotational strain gauge.

18. The grain cart of claim 16, further comprising a user interface device operatively connected to the processor.

19. The grain cart of claim 18, wherein the user interface device is configured to notify a user that the transfer element may not be moved to the folded position.

20. The grain cart of claim 18, wherein the user interface device comprises at least one of a smart phone or a computer.

21. A grain cart comprising:
a container configured to hold agricultural material;
a transfer element configured to transfer agricultural material from the container;
a hydraulic actuator operatively connected to the transfer element and configured to move the transfer element between a folded position and an unloading position;
a drivetrain configured to drive the transfer element;
a torque sensor configured to detect a torque of the drivetrain; and
a processor operatively connected to the torque sensor and configured to compare the detected torque to a torque threshold and direct the operation of the hydraulic actuator based at least in part on a result of the comparison of the detected torque and the torque threshold.

22. The grain cart of claim 21, further comprising a solenoid operatively connected to the hydraulic actuator and configured to control the operation of the hydraulic actuator;
wherein the processor is operatively connected to the solenoid and configured to direct the operation of the solenoid based at least in part on a result of the comparison of the detected torque and the torque threshold.

23. The grain cart of claim 21, wherein the torque sensor comprises a rotational strain gauge.

24. The grain cart of claim 21, further comprising a user interface device operatively connected to the processor.

25. The grain cart of claim 23, wherein the user interface device is configured to notify a user that the transfer element may not be moved to the folded position.

26. The grain cart of claim 23, wherein the user interface device comprises at least one of a smart phone or a computer.

* * * * *